United States Patent
Shtern et al.

(10) Patent No.: US 12,505,119 B2
(45) Date of Patent: Dec. 23, 2025

(54) FEDERATED DECENTRALIZED DATA SHARING

(71) Applicant: Bitnobi, Inc., Toronto (CA)

(72) Inventors: Mark Shtern, Toronto (CA); Justin Ngo Le, Woodbridge (CA); Paul Darius Vytas, Etobicoke (CA); Fahad Karar, Oakville (CA)

(73) Assignee: MYANT TECHNOLOGIES INC., Mississaga (CA)

( * ) Notice: Subject to any disclaimer, the term of this patent is extended or adjusted under 35 U.S.C. 154(b) by 0 days.

(21) Appl. No.: 18/688,031

(22) PCT Filed: Aug. 25, 2022

(86) PCT No.: PCT/CA2022/051291
§ 371 (c)(1),
(2) Date: Feb. 29, 2024

(87) PCT Pub. No.: WO2023/028694
PCT Pub. Date: Mar. 9, 2023

(65) Prior Publication Data
US 2025/0124045 A1   Apr. 17, 2025

Related U.S. Application Data

(60) Provisional application No. 63/240,475, filed on Sep. 3, 2021.

(51) Int. Cl.
*G06F 16/20* (2019.01)
*G06F 16/2455* (2019.01)
(Continued)

(52) U.S. Cl.
CPC ........ *G06F 16/256* (2019.01); *G06F 16/2455* (2019.01); *G06F 16/24564* (2019.01);
(Continued)

(58) Field of Classification Search
CPC ............ G06F 16/2455; G06F 16/2456; G06F 16/24564; G06F 16/256; G06F 21/62; G06F 2221/2141
See application file for complete search history.

(56) References Cited

U.S. PATENT DOCUMENTS

| | | | |
|---|---|---|---|
| 10,769,148 B1* | 9/2020 | Binkert | ............ G06F 16/24542 |
| 2010/0010976 A1* | 1/2010 | Johnson | ............ G06F 16/2456 |
| | | | 707/E17.136 |

(Continued)

OTHER PUBLICATIONS

International Search Report/Written Opinion dated Oct. 27, 2022.

*Primary Examiner* — Diedra McQuitery
(74) *Attorney, Agent, or Firm* — Dickinson Wright LLP; Yuri Chumak

(57) ABSTRACT

Methods and systems for secure, federated, and decentralized ownership, storage, sharing and usage of big data are provided. According to one example, a first server maintains access to a plurality of federated data sources including at least one local database and at least one remote database. The local database is subject to a first data policy controlled by the first server and the remote database is subject to a second data policy controlled by a remote server. The first server receives a query from a user electronic device and verifies at least one permission attribute of the user electronic device relative to the data policies. After the federated data operation query has been approved, the first server generates results of the query including data fields from the local and remote databases in compliance with the first and second data policies.

11 Claims, 8 Drawing Sheets

(51) Int. Cl.
 *G06F 16/25* (2019.01)
 *G06F 21/62* (2013.01)
(52) U.S. Cl.
 CPC .......... *G06F 21/62* (2013.01); *G06F 16/2456* (2019.01); *G06F 2221/2141* (2013.01)

(56) References Cited

U.S. PATENT DOCUMENTS

| | | | |
|---|---|---|---|
| 2015/0134826 A1* | 5/2015 | Shah | H04L 67/51 |
| | | | 709/226 |
| 2018/0373887 A1* | 12/2018 | Smith | G06F 21/6227 |
| 2019/0317949 A1* | 10/2019 | Florissi | G06F 16/2471 |
| 2020/0311300 A1 | 10/2020 | Callcut et al. | |
| 2021/0158933 A1 | 5/2021 | Frosch et al. | |

\* cited by examiner

FEDERATED DECENTRALIZED DATA SHARING

FIELD OF THE INVENTION

The field of the invention is information retrieval and, in particular, a platform for secure, federated, and decentralized ownership, storage, sharing and usage of big data.

BACKGROUND

The following description includes information that may be useful in understanding the present invention. It is not an admission that any of the information provided herein is prior art or relevant to the presently claimed invention, or that any publication specifically or implicitly referenced is prior art.

Many modern software applications rely heavily on big data, either as a core asset of their basic use cases or as supporting infrastructure used to improve quality of service. At the same time, privacy and security requirements constrain how the data can be stored and used in a protected manner. The security of big data becomes even more challenging when it is owned by different entities that desire to use and share the data of others, including in combination with their own data.

The ability to access data among organizations is a challenging problem. Organizations often have unique policies, standards, baselines, guidelines, and procedures that dictate the terms of data exposure to the outside world. For data scientists, it is often difficult to get access without approval from various entities, including the data owner, the data custodian, and security professionals. Waiting for approval is typically lengthy, and, even if approved, the data may be obsolete by that time. After sharing, a raw copy may no longer be under the control of the original data owner without a reliable audit trail of data operations performed on the data. Data format and quality may not be in a desired format, leading to unnecessary data pre-processing.

There have been prior approaches that have attempted federated data sharing. The word "federated" refers to a database technique of transparently mapping multiple database systems into a single federated database. Many of the prior approaches appear to require a central system or node to function. For example, Leclerc et al. (US 2015/0058314) describes a central service that integrates information from many disparate sources to allow searching. Gutfreund (US 2020/0394197) describes a central service that accepts a query, extracts semantic concepts from it and performs a search across many disparate sources. Dyell et al. (US 2020/0357496) describes a central service that connects to a multitude of patient health sensors that then allows the user to provide parameters to identify the sensor(s) of interest and configure it to collect the desired data. Wang et al. (US 2020/0327250) describes facilitating secure exchange of health information among various stakeholders where data is contributed to a secure central store of health data, which is then used for aggregate analysis.

Still other approaches to federated data sharing suffer when access to data cannot be controlled at the nodes through user permission settings. Ford et al. (US 2019/0222560) describes a federated search across several computers with disparate content storage facilities that is consolidated into one result. El Kaed et al. (US 2019/0179820) describes a sequential federated query against a variety of data sources for distributed residential, commercial, and/or industrial systems, tying together time series data (e.g. collected from an IoT) with contextual data (e.g. geographical location, location inside a building). Kesarwani et al. (US 2019/0155956) describes a process for association rule mining of an encrypted database using additive homomorphism. Aggour et al. (US 2020/0272664) describes running federated queries against a plurality of data stores storing disparate data types, generating a metadata knowledge graph for links and relationships of the data stores, applying ML and AI techniques then presenting visualizations from the search results. Callcut et al. (US 2020/0311300) refers to performing analytics on each of several sources of privacy protected data and then combining the analytics results. Farh et al. (US 2018/0060523) describes the federation of medical data knowledgebases creating a "federation layer" to collect data of interest into one result. There is limited or no discussion of how sharing is controlled for specific users.

Rogers et al. (US 2018/0096166) describes how to enable two or more data providers that do not trust each other with their data to pool their data for analysis. This is done by translating conventional database SQL queries into secure multiparty computation so that the data providers can analyze their collective data without requiring any of them to disclose private information. However, use of the secure multiparty computation (SMC) cryptographic protocols of Rogers can add significant overhead in computation and may render working with large data sets impractical or inconvenient.

Brainard et al. (U.S. Pat. No. 10,915,542) describes a model-based data sharing utility with a multi-master replication scheme. Brainard discloses a technique of data sharing of a database management systems (DBMS) and provides constraint modifications to improve searching across the databases. The stated goal of Brainerd is to provide lower latency for data sharing and federated searching. A data model for sharing is constructed that attempts to skip acknowledgement processes, conflict resolution processes, object resolution processes, deconflicting processes, access control processes, etc. with the goal of improving latency. However, the described system does not define access control at a system level but rather appears to depend on the access control definitions of each underlying database. Thus, a user trying to perform a federated search operation must have or request permission from the administrator of each database in advance, causing access delays or potential gaps when performing data operations.

Florissi et al. (US 2019/0317949) describes multiple distributed analytic workflows to be performed across a plurality of data processing clusters associated with respective data zones but provides little or no discussion of how an analytics workflow is created or orchestrated.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of features used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for a system that allows for secure, federated, and decentralized ownership, storage, sharing and usage of big data and to mitigate some of the obstacles to data sharing.

BRIEF DESCRIPTION OF THE DRAWINGS

Various objects, features, aspects, and advantages of the inventive subject matter will become more apparent from the following detailed description of preferred embodiments, along with the accompanying drawing figures in which like numerals represent like components.

DETAILED DESCRIPTION

Figure 1:
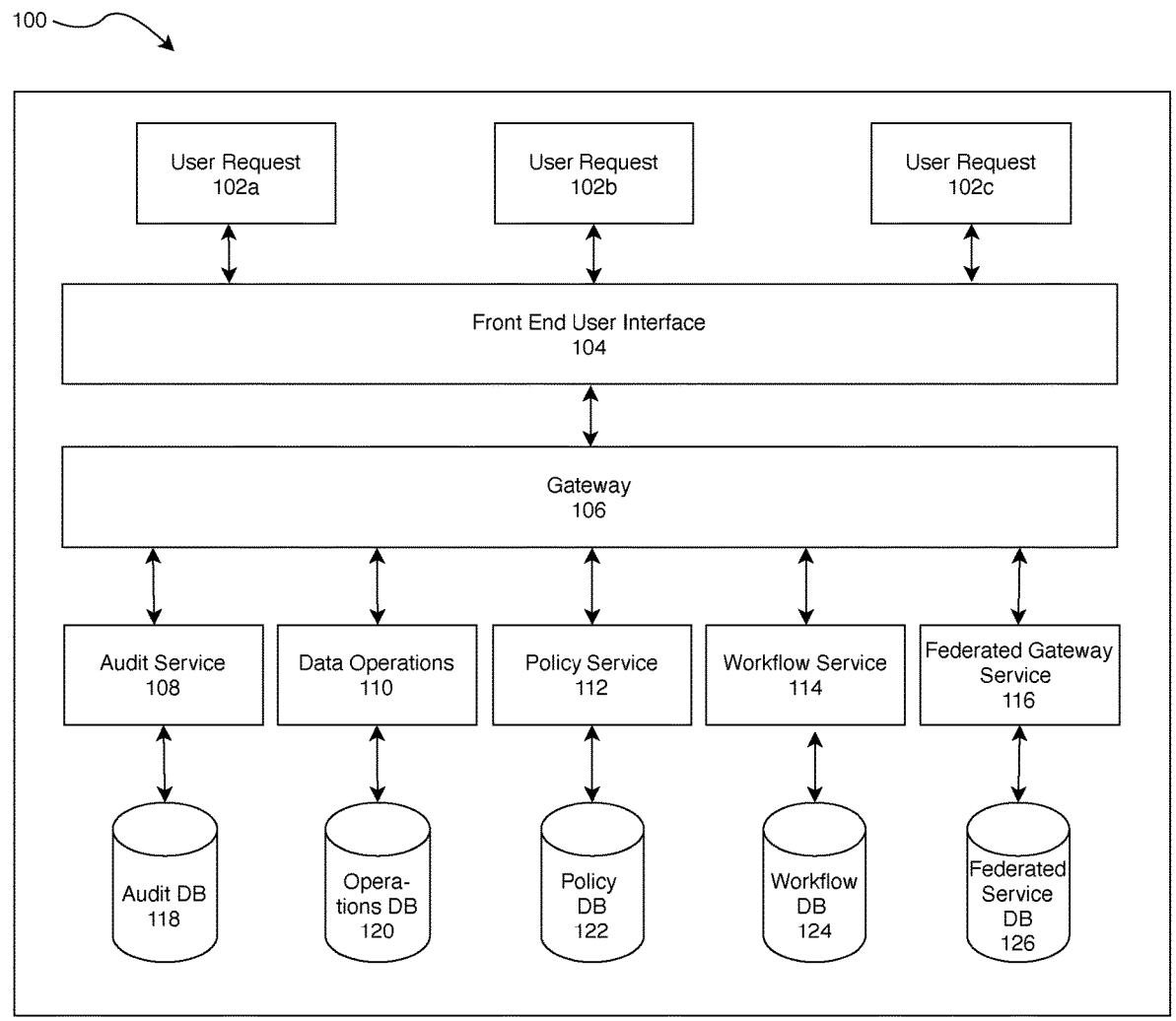
FIG. 1 is a block diagram of a system architecture for secure, federated, and decentralized sharing of data in accordance with an example of the present specification.

Throughout the following discussion, references may be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial or health data query protocols, or other electronic information exchanging methods. Data exchanges can be conducted over a packet-switched network, the Internet, LAN, WAN, VPN, or other type of packet switched network.

One should appreciate that the systems and methods of the inventive subject matter provide various technical effects, including providing secure, federated, and decentralized ownership, storage, sharing and usage of big data, including in combination with remote and local data sources.

The present specification provides systems and methods for two organizations or departments, each with their own servers managing access to data in their organization, to set a data policy for associated user electronic devices and data sources. Advantageously, federation of the servers through a secure connection allows a user electronic device associated with the first organization's server to create a workflow that merges data from one or more remote servers with access controlled through a data policy.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, the term federated system refers to a type of system that transparently maps multiple autonomous database systems into a single federated database or a fewer number of federated databases. A federated database system is sometimes called a distributed database management system. Typically, with such systems, there is no actual data integration in the constituent disparate databases. Federated database systems can provide a uniform user interface, enabling users and clients to store and retrieve data from multiple databases with a single query, even if the constituent databases are heterogeneous. It is a challenging problem to integrate data from constituent databases in a federated database system, particularly when different nodes or components feature different file formats, data models, access protocols, query languages, and the like. Use of the term "data" in this specification extends to any big data deliverable or output such as a data set, an algorithm or a model.

The specification is directed to a platform for secure, federated, and decentralized ownership, storage, sharing and usage of big data. The platform is general but in one example the platform offers significant advantages in an ecosystem of big data stakeholders—including data consumers and data providers—that define data usage, storage and access based on data policies. The term data consumer (also referred to as a data user) refers to an entity or application that receives and/or uses data for query, analysis, reporting, and other data operations. The term data provider (also referred to as a data owner or data holder) refers to the actual owner or their agent or custodian that is responsible for the development, organization, and governance or oversight of a database.

The skilled reader will appreciate that many modern software applications rely heavily on big data, either as a core asset of their basic use cases or as supporting infrastructure to improve their quality of service. At the same time, privacy and security requirements including regulations mandated by different countries, such as HIPAA and GDPR, constrain how data can be stored and used in an accountable manner. Data sharing is challenging when multiple stakeholders belong to a business ecosystem in which data is a core commodity that is exchanged, shared and/or combined. In these ecosystems, to increase trust and sharing, it is beneficial to have database records owned and stored in a de-centralized manner by the data providers that control access according to a data policy. The term data policy refers to a set of guidelines or requirements guidelines how an entity's data and information assets are managed, collected, used, and disclosed to other entities. According to one example, a data policy is defined by a set of key-value pairs or attributes.

According to examples of the present specification, methods and systems for secure, federated, and decentralized ownership, storage, sharing and usage of big data are provided. According to one example, a first server maintains access to a plurality of federated data sources including at least one local database and at least one remote database. The local database is subject to a first data policy controlled by the first server and the remote database is subject to a second data policy controlled by a remote server. The first server receives a query from a user electronic device and verifies at least one permission attribute of the user electronic device relative to the data policies. After the federated data operation query has been approved, the first server generates results of the query including data fields from the local and remote databases in compliance with the first and second data policies.

Advantageously, by providing a network of servers each associated with a local database, the system facilitates ownership of data across multiple organizations or entities. The server (also referred to as an instance or node) sets access rules (also referred to as a data policy or data governance policy) that controls data sharing across organizations. The server allows users or participants within an organization to define additional or different data policies with desired permissions or attributes, and to create workflows that define data operations including filtering, data cleaning, aggregation, and custom functions (e.g., using the scripting languages python or R). Upon execution of a workflow, a data policy can be attached to a workflow.

Examples of the present specification provide a decentralized data sharing network where data owners having access to data at the node can control its sharing with data analysts through data policies. This is contrary to previous approaches that require updating access policies on each component database or data source for individual analysts. Advantageously, analysis algorithms can be run in an organization's data center and then the results can be aggregated via federation and then presented for visualization or further data operations.

According to one example of the present specification, users of a server instance have access to local or remote database provided that the user's permissions or attributes match the policy (in other words, are verified) that was defined by the data provider, that is, the owner of the original data source or the creator of a workflow. Once verified, such users can process data from the local or remote database as part of a new workflow and apply new data policies to the new workflow for further re-use. Advantageously, workflows can be defined in a graphical user interface, such as a web-browser interface.

The present specification discloses a federated data access and processing platform. The platform includes a data workflow definition and execution engine. In this example, a user electronic device specifies the data sources, the sequence of operations on data, as well as the access policies on data and operations. The platform enables participants to: a) share data in a secure and auditable manner; b) exchange data in a secure way; c) store and share metadata; d) audit the data access and data operations performed by different users; e) perform analytics; f) reduce the overhead associated with sharing or moving data; g) act as an intermediary or escrow between data consumers (or users) and data owners; h) provide token-based authentication to improve online usability and security; and i) delegate computation in whole or in part away from a data owner's infrastructure.

Disclosed examples according to the present specification offer significant advantages. For example, the participants in the ecosystem can decide if local or remote data is to be distributed or if data operations are to run on a participant's infrastructure based on permission or attributes. This is particularly useful when processing data fields containing personally identifiable information (PII) or personal data (PD) including financial and health data fields. According to disclosed examples, residual data in the system after data operations can be or will be deleted after all federated activities have been completed.

Examples of the present specification can be applied to situations where a proprietary algorithm is needed to access proprietary data from two different organizations that are not willing to share direct access to their resources. A system of the present specification can play the role of mediator by applying the algorithm from one organization to the data from a second organization, and permitting data operations to be run. The security of the system can be enhanced through the implementation of an audit function as well as a function that would certify the return of data or an algorithm. Furthermore, some jurisdictions do not allow certain data (e.g., containing personally identifiable information or other sensitive information) to be exported. Disclosed examples of the present specification can allow data operations to be run on a data center within that jurisdiction with sanitized results being available for export, thus facilitating secure and controlled data sharing.

The term "big data" is generally used to describe collections of data of a relatively large size and complexity, such that the data becomes difficult to analyze and process within a reasonable time, given computational capacity (e.g., available database management tools and processing power). Thus, the term "big data" can refer to data collections measured in gigabytes, terabytes, petabytes, exabytes, or larger, depending on the processing entity's ability to handle the data. As used herein, and unless the context dictates otherwise, the term "big data" is intended to refer to collections of data stored in one or more storage locations and can include collections of data of any size. Thus, unless the context dictates otherwise, the use of the term "big data" herein is not intended to limit the applicability of the inventive subject matter to a particular data size range, data size minimum, data size maximum, or particular amount of data complexity.

In this specification, methods and systems for secure, federated, and decentralized ownership, storage, sharing and usage of big data are provided.

FIG. 1 illustrates the architecture of a system 100 (also referred to as a server 204 or node or instance), in accordance with an example of the present specification. The skilled reader will appreciate that the system 100 can be deployed as a single unit context based on a micro-service architecture. The front-end interface services 104 of the system 100 are configured to handle one or more user requests 102. User requests 102 are passed through gateway 106 to several other services including audit services 108, data operation services 110, policy services 112, workflow services 112, and federated gateway services 116.

The front-end user interface services 104 interface with one or more user electronic devices (discussed in further detail below). The interface can be web-based. A user electronic device interacts with the front-end user interface services 104 to create workflows or policies, or to visualize or organize data using various plug-in tools (powerBI™, Jupyter™ notebooks graphing library, custom reporting canvas or any other data analytic/machine learning data processing software packages). Front-end user interface services 104 can be grouped by sections, also called resources. According to one example, the resource allocation model is based on least privileged access. In one example, there are five resources available to the user electronic device (catalog, workflows, reports, exports, admin). An admin user can dynamically allocate and de-allocate resources to each user electronic device. According to examples of the present specification, an admin user can also track resources of a server 204 (including CPU usage, disk usage) and make changes to system resources and/or resource allocation among users.

In one example of the present specification, policy services 112 can utilize an Open Policy Agent (OPA) to match user attributes to a corresponding workflow, that is, to verify that a user has permission to access a workflow, and the underlying data. The skilled reader will appreciate that the model for access control in this example is attributes-based access control (ABAC) but any other suitable model can be used. The attributes can range from general to specific. For example, attributes can include organization, role, and department. The combination of attributes that can be used for access control is virtually unlimited.

Still with reference to the example of FIG. 1, the gateway service 106 acts as a central message broker that provides additional control between the front-end user interface services 104 and the other services. The role of the gateway services 106 extends to error handling, input validation, authentication, and authorization. Audit services 108 provide logging of activity in the system 100 by user electronic devices. Granular logging level can be configured based on various environments. The main purpose of workflow services 114 is to perform workflow processing, either directly or through a child process. Processing of workflows can be achieved using an engine which can be MongoDB™, Hadoop™, or any engine that can deliver a high degree of disk I/O throughput. Federated gate way services 116 provide cross-boundary communication between local system 100 and other remote systems 100 (not shown) within a network.

Figure 2:
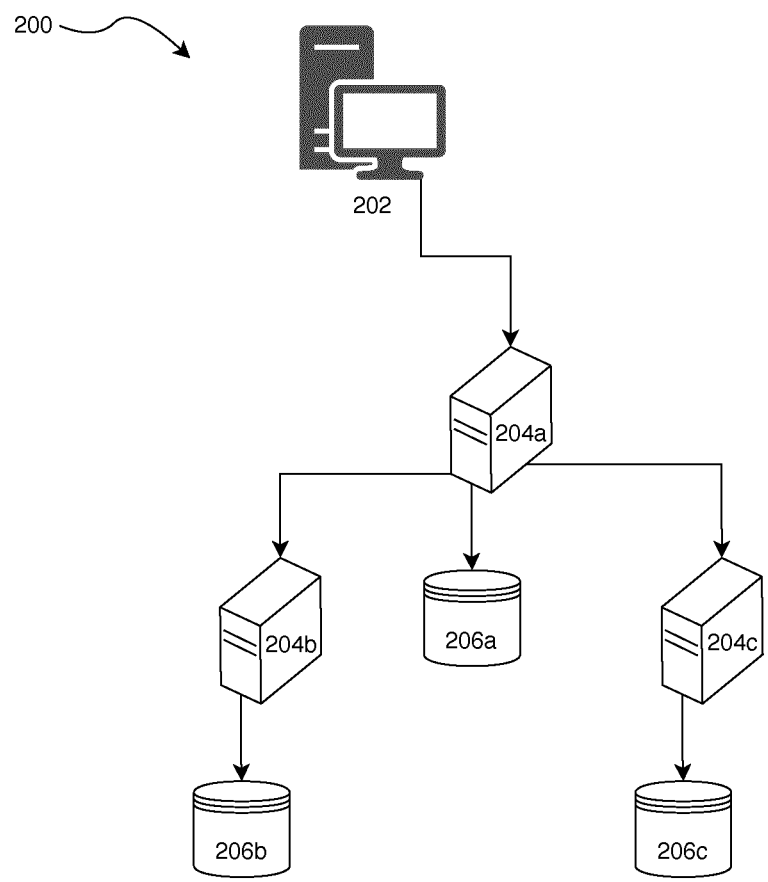
FIG. 2 is a block diagram of a networked ecosystem for secure, federated, and decentralized sharing of data in accordance with an example of the present specification.

Data operation services 110 offers basic data operations including atomic operations on the digital assets stored in the data repository 206 (shown in FIG. 2). Higher level operations and actions, such as data transformations (e.g., for anonymization or privacy reasons) can be expressed in a domain specific language ("DSL"). Use of DSL can hide some of the complexity of data operations and gives power users the ability to use direct scripting without specific knowledge of programming, including by performing calculations and performing data preparation operations.

Still with reference to FIG. 1, according to one example of the present specification, the services of the system 100 can be extended by the user, using workflow services 114 and policy services 112. These services also allow for integration with external applications as well as external data repositories.

With continued reference to FIG. 1, front-end user interface services 104 support different roles for users including: a data creator, the owner of data or a data job created from existing data; and an operation creator, the creator of a data operation. A data operation is any data processing operation such as a query, insert, join, and the like. A data operation has several properties: deterministic (generates the same result from the same input—true/false); open source (source code available and binaries can be regenerated on demand—true/false); operation creator (list of participants or actors that approved the data operation; price (optional)). All data operations may have a clearly defined input and output. In one example, a data operation can be implemented as a model and can be executed as an electronic contract or an external application. Every execution of data operation can be recorded using the audit services 108. Data operations include a. Cryptographic transformation—action for encryption/decryption of digital assets
  b. Filters—action for removing digital assets
  c. Transformation—action for modifying digital assets (e.g. anonymization)
  d. Export—action for streaming digital assets to external application or system
  e. Query
  f. Data import—acting for streaming digital assets for data protection
  g. Save into data repository 206

According to examples of the present specification, data operations can be run as electronic contracts that execute a sequence of data operations after receiving approval or permission from the front-end user interface services 104. According to this example, after a user is granted permission from the front-end user interface services 104 and while the user's permission is not expired, the user can run operations without seeking subsequent permission. The operation can run following a lazy execution principle; the operation or transformation is executed if data should be exported and some data actions are non-deterministic, query or execution was forced by user. If all data operations are deterministic, transformed data will not be recorded into system except when a subset of the digital assets is marked for deletion; or a request for storing digital assets is explicit.

FIG. 2 illustrates a networked eco-system 200 for secure, federated, and decentralized sharing of data in accordance with an example of the present specification. The eco-system 200 allows data to be shared among many participants by using distributed data repositories 206, across many servers 204 (also called systems or nodes or instances) that are accessible by user electronic devices 202. FIG. 2 illustrates multiple repositories 206 given by reference numbers 206a, 206b and 206c and multiple servers given by reference numbers 204a, 204b, and 204c. According to one example, each server 204 resides under a different participant's administrative domain. The term repository refers to a data storage device that holds data, makes data available to use, or that organizes data. A user electronic device 202 can include one or more computing devices that enables a user or data analyst to access data from servers 204 by creating and submitting query jobs.

With reference to FIG. 2, it will be appreciated that the eco-system 200 is an inter-connected collection of servers 204 (shown as system 100 in FIG. 1). In this example, each server 204 belongs to a single organization or a single department, depending on the use case. Advantageously, a network of servers 204 allow data sharing across organizations or departments.

Figure 3:
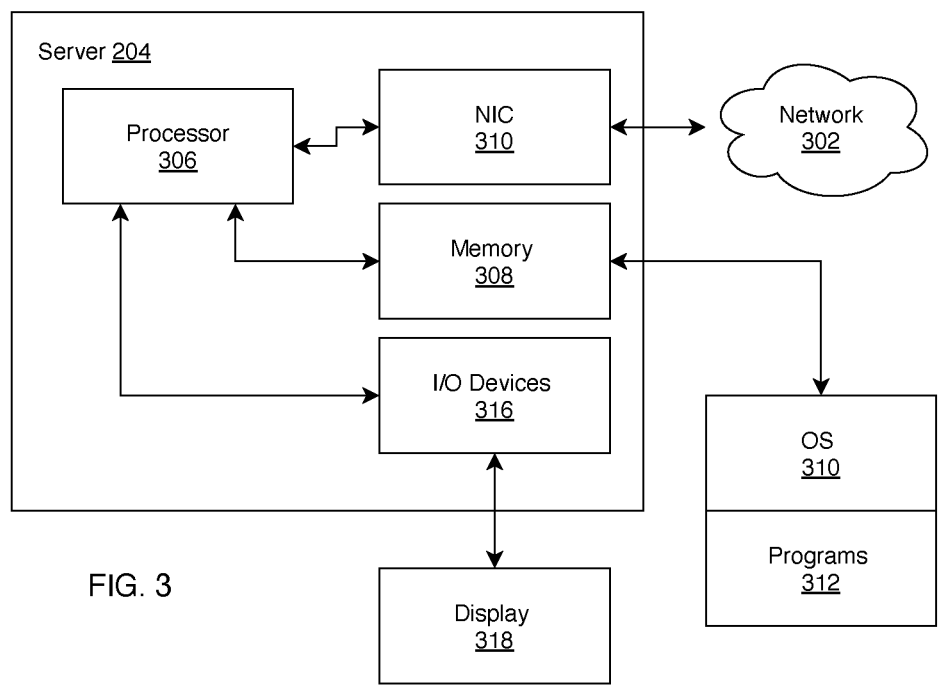
FIG. 3 is a block diagram of a server for running federated data operations according to the system architecture of FIG. 1 in accordance with an example.

Turning to FIG. 3, server 204 can include one or more computing devices programmed to perform data operations. Thus, the server 204 can include at least one processor 306, at least one non-transitory computer-readable storage medium shown as memory 308 (e.g., RAM, ROM, flash drive, solid-state memory, hard drives, optical media, etc.) storing computer readable instructions that cause the processors to execute functions and processes of the inventive subject matter, and communication interfaces, such as network interface devices, that enable the server 204 to perform data exchanges with other servers 204 and to create a network of peer-to-peer servers 204. The computer-readable instructions (shown as OS 310 and Programs 312) that the server 204 uses to carry out its functions can be instructions allowing the server 204 to access, retrieve, and process data operations to authorized parties, access control functions, data sharing, merging, etc. The server 204 can include input/output interfaces 316 (e.g., keyboard, mouse, touchscreen, display 318, sound output devices, microphones, sensors, etc.) that allow an administrator or other authorized user to enter information into and receive output from the server 204. Examples of suitable computing devices for use as a server 204 can include server computers, desktop computers, laptop computers, tablets, smartphones, smartwatches, wearables, IoT devices, etc.

Figure 4A:
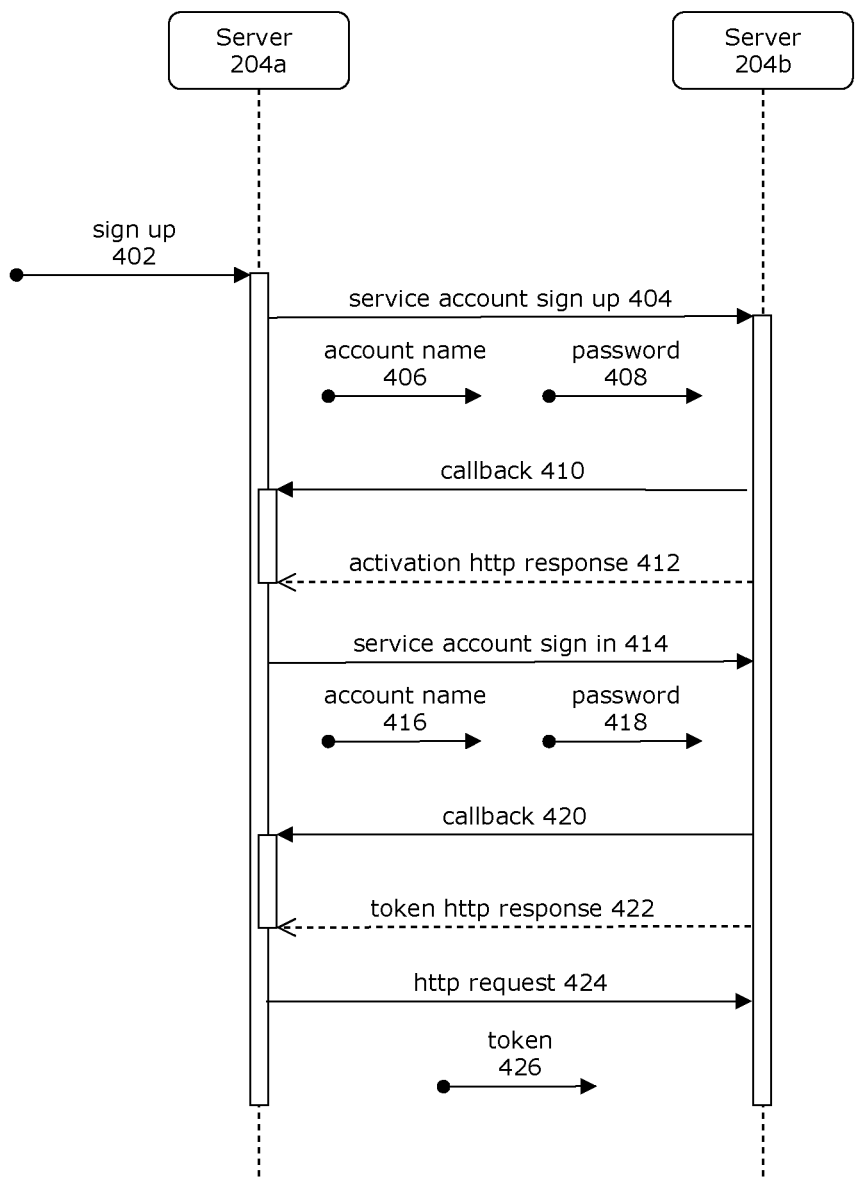
FIG. 4A is a sequence diagram of a federated data operation running on the server of FIG. 3 in accordance with an example.

Still with reference to FIG. 4A, server 204a is deployed within an organization (called organization A) and works on the organization's pre-existing infrastructure, while server 204b is part of organization B's network. According to an example, the administrator of server 204b can open a service account to server 204a (shown as line 402, line 404, line 406, line 408 and line 410). Once the administrator of server 204a has verified and approved the service account request to access (shown as line 412), instance 204a will grant an access token to instance 204b (shown as line 414, line 416, line 418, line 420 and line 422). Any subsequent request from organization B to organization A can get validated using the granted token (shown as line 424 and line 426). The term "service account" means a system account that is created to isolate a system service or application. According to one example, a service account is a higher level account that manages communication between sets of servers 204. According to this implementation, a single account establishes a connection from server 204a to server 204b which entitles all users from server 204a to use that connection and query against data sets associated with server 204b assuming that the users meet all the required attributes and policies of server 204b.

Figure 4B:
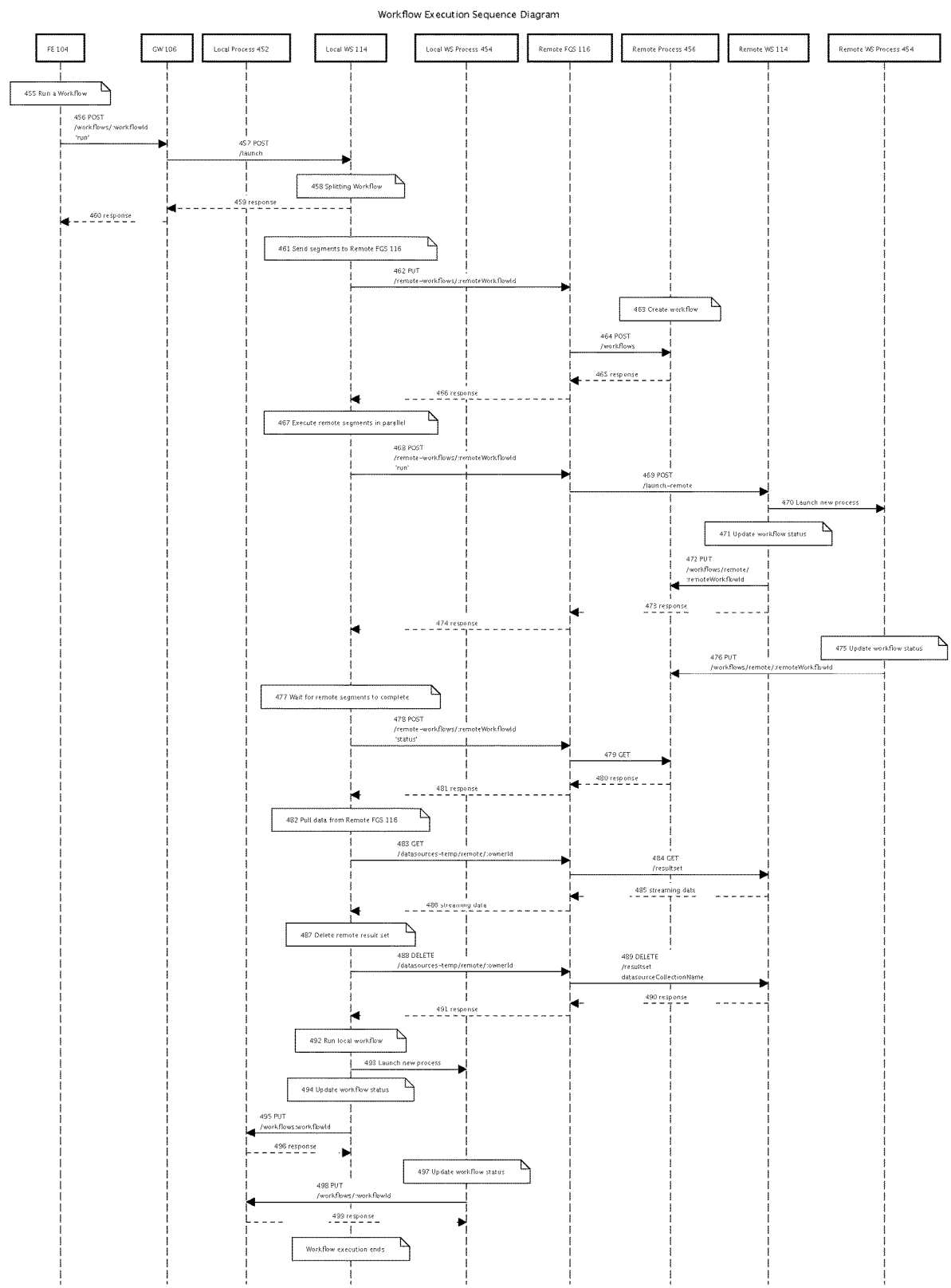
FIG. 4B is a sequence diagram of an escrow data operation running on the server of FIG. 3 in accordance with an example.

A flowchart illustrating an example of a method of federation of two servers 204 is shown in FIG. 4B. Again, this operation or method can be carried out by applications or software executed by, for example, a processor of the server 204. The method can contain additional or fewer processes than shown and/or described and can be performed in a different order. Computer-readable code executable by at least one of the processors to perform the method can be stored in a computer-readable storage medium, such as a non-transitory computer-readable medium.

Recall that server 204a is deployed within an organization (called organization A) while server 204b is part of organization B's network. Now with reference to FIG. 4B, server 204a (not shown) includes front-end interface services 104 (shown as FE 104 in FIG. 4B) which, as described above, receives user actions from a browser or other application. The server 204a also includes gateway services 106 (shown as GW 106 in FIG. 4B) which, as described above, accepts API requests from FE 104 and directs the requests to the appropriate service(s). The server 204a also includes Local Process 452, which for the purpose of this example logically represents a backend process that supports FE 104 requests. The server 204a further includes workflow services 114 (shown as Local WS 114) which, as described above, handles workflow requests. Local WS Process 454 is a local process launched by Local WS 114 to execute workflow steps.

Still with reference to FIG. 4B, server 204b (not shown) includes federated gateway services 116 (shown as Remote FGS 116 in FIG. 4B). As described above, Remote FGS 116 is used by server 204a to communicate with server 204b. The server 204b also includes Remote Process 456, which for the purpose of this example logically represents a backend process that supports FE 104 requests. In this example, Local Process 454 and Remote Process 456 are essentially the same process that reside on different servers. The server 204b further includes workflow services 114 (shown as Remote WS 114) which, as described above, handles workflow requests. Remote WS Process 454 is a remote process launched by Remote WS 114 to execute workflow steps.

With continued reference to FIG. 4B, FE 104 receives a user query to run a data operation at step 455, sending a message GW 106 at step 456 and Local Process 452 at step 457. At step 458, a function checks if a workflow data operation contains a remote segment, providing responses at steps 459 and 460. Remote segments are sent to Remote FGS 116 and Remote Process 456 of server 204b at steps 461 and 462 (e.g., using the service account information for authentication). Additional remote segments can be sent to servers 204*c*, 204*d*, . . . 204*n* as the case may be, with necessary alterations to the method (not shown in FIG. 4B). At step 463, remote workflows are created in server 204*b*, with messages exchanged between Remote FGS 116 and Remote Process 456 at steps 464 and 465, and then a message returned to Local WS 114 at step 466. The remote segments are executed in parallel at step 467. The method waits for the results of the remote segment execution at step 477. Data is pulled from server 204*b* at step 482. FIG. 4B shows a double-hop streaming of data from Remote WS 114 to Remote FGS 116 and then to Local WS 114 (at steps 485 and 486, respectively). The remote result set is deleted at step 487. After execution of the remote segment(s), the local segment of the workflow is executed at step 492. After execution of the local segment, the workflow ends after step 499.

Table 1 describes a "user story" for an aspect of federated data sharing, in accordance with the present specification.

TABLE 1

User Story

1. Local server administrator creates a service account and establishes a connection with a remote server. Connection status is displayed.
2. Remote server activates or deactivates a service account for each local server that wishes to access it.
3. Local server administrator edits and updates the service account parameters (e.g. remote server hostname or IP address changes, change password, change descriptions)
4. Data owner controls access to a result set through policies established for a data repository. The data policy of a data source is evaluated by the server that maintains the data source.
5. User electronic devices can browse available data sources on remote servers (through policies on a remote server that match the user's attributes)
6. During workflow processing, all data remains on the same server as the data source. For example, if a workflow is created on server 204b to use a remote data source from server 204a, then when the workflow executes all intermediate data and result set stays on server 204a.
7. One exception is preview data. During workflow editing, a small number of rows of data can be copied from the remote server to the local server and then sent to the browser to provide visual verification to the user.
8. A second exception is when data sources on two different servers need to be joined (or merged with a union). In this case, a new workflow canvas element "Data Mover" moves intermediate data from a remote server 204a to the local server 204a. Both inputs of the Join (or Union) operation then use a local copy of the temporary data. A data policy controls if the temporary data is subject to deletion or further anonymization/ transformation at a pre-defined time period or after the completion of data operations.

Figure 5:
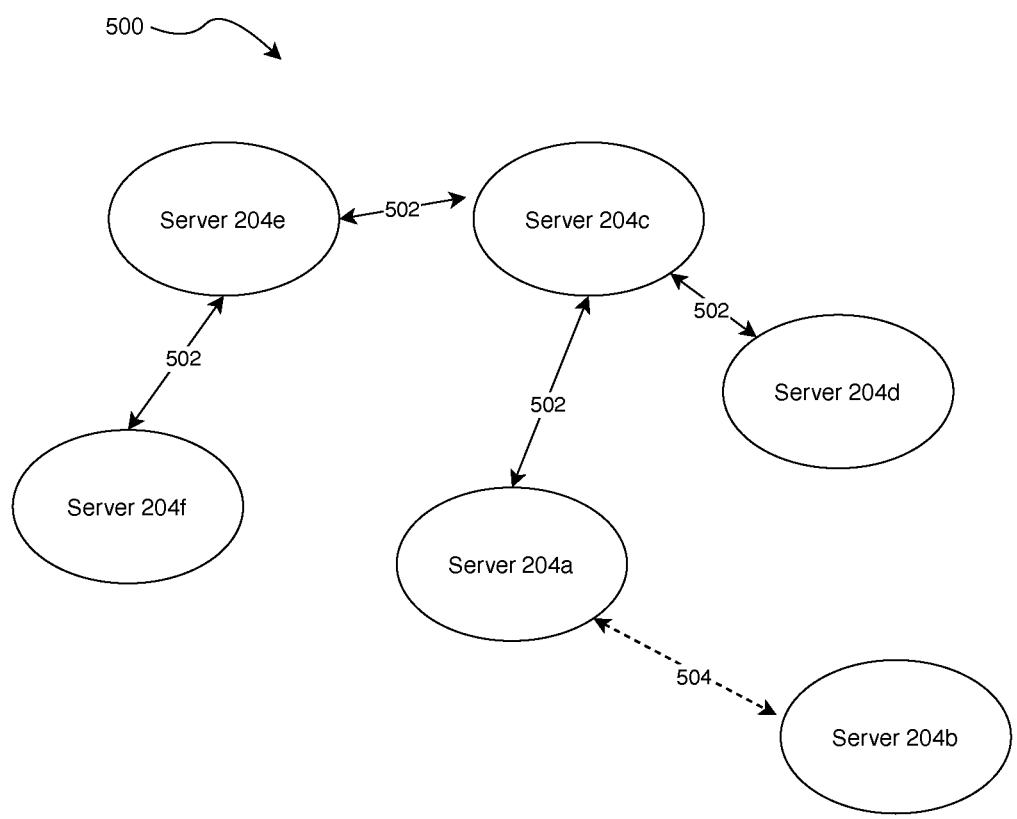
FIG. 5 is a schematic diagram of a network environment for secure, federated, and decentralized sharing of data in accordance with an example of the present specification, showing multiple servers connected over a network.

FIG. 5 is a schematic overview of a networked ecosystem 500 for secure, encrypted, and distributed sharing of data. The ecosystem 500 includes one or more nodes shown as servers 204 connected by links 502 that communicatively couple the nodes via one or more data exchange networks (e.g., Internet, cellular, Ethernet, LAN, WAN, VPN, wired, wireless, short-range, long-range, etc.). As shown in FIG. 5, once server 204*b* (also called the local server 204*b*) is part of the server 204*a*'s network (also called the remote server 204*a*), any user electronic device that is part of the same organization as local server 204*b* can get access to the data shared by remote server 204*a*. As mentioned, a data policy is attached to the data based on attributes or permissions, meaning the user electronic devices will only get access to the data that matches an attribute of the user electronic device. Advantageously, local server 204*b* can obtain access, via federation, to remote servers 204*a*, 204*c*, 204*d*, 204*e*, and 204*f*. According to some examples, data from local servers 204*a* as well as remote servers 204*b*, 204*c*, 204*d*, 204*e*, or 204*f* can be previewed in a data catalog system which crawls through the federated network and searches for any dataset that matches the user's attributes. Searching is a complicated task which requires a high degree of accuracy and usability. Crawling through the federated network on demand may take an excessive amount time at the expense of the user's experience. Examples of the present specification contemplate an auxiliary data structure that stores a cacheable search result can be implemented to reduce the delay.

The term "local server" refers to a server 204 that handles data consumer queries for an organization or department, such as server 204*b*. It will be appreciated that workflow definitions and execution status can be stored on a local server 204*b*. If a workflow contains a data source from local server 204*b*, then a workflow segment can be executed on local server 204*b*. The term "remote server" refers to a server 204 that maintains a remote data source, such as remote server 204*a*. If a workflow created by a user on local server 204*b* contains a data source from remote server 204*a*, then the workflow segment cannot be executed on the local server 204*b*, but instead must be executed on the remote server 204*a*. Advantageously, this does not permit data operations to be executed locally on remote data sources, enhancing the security of the data and preventing unnecessary copies of the data from being created or shared. Instead, only the results of the data operations executed by remote server 204*a* are sent to the local server 204*b*. According to examples of the present specification, having data distributed across multiple servers 204 is a trivial task. However, merging runs on a single server 204*a*. Aggregating a distributed remote segment (shrink in dimension), reduces the likelihood of running out of system resources in the merging process.

Figure 6:
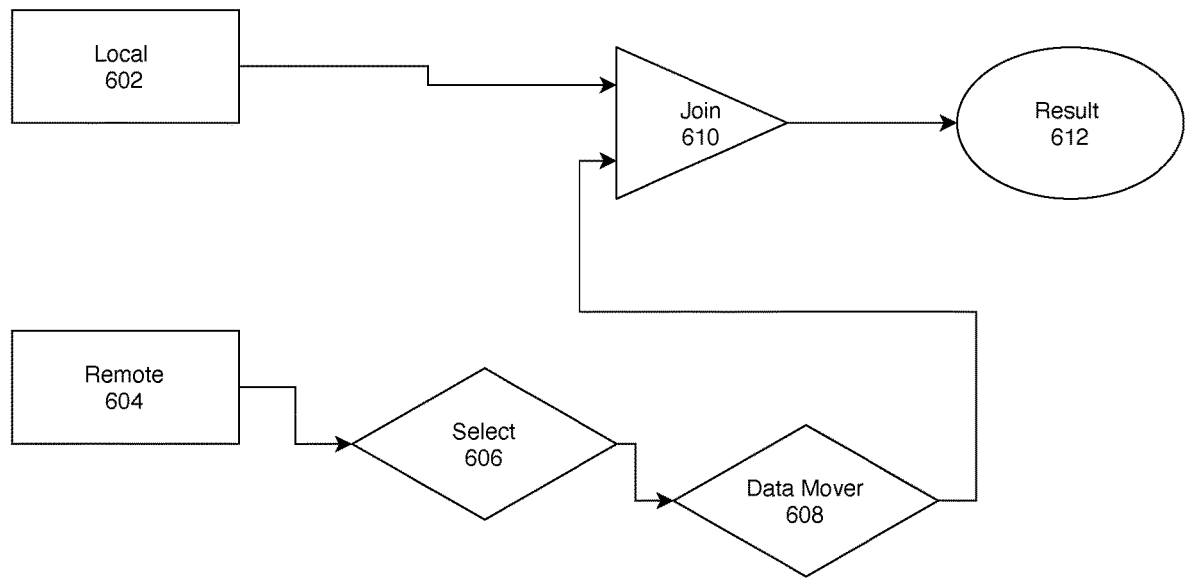
FIG. 6 is a view illustrating a screenshot of an analytics user application in accordance with an example of the present specification.

According to examples of the present specification, federated workflow processing includes support for SQL-like query operations, scripting, machine learning models, and the like. As shown in FIG. 6, a workflow editor application provides a user or administrator of a local server 204*b* with tools to build workflows that execute on the local server 204*b*. In accordance with examples of the present specification, each operation of a workflow can be represented by a cell block that is structured as a tree. The leafs are the data sources (sql, remote, local, csv upload), the inner nodes are the operations (select, join, scripting, etc), and the root is either a result set or a machine learning or deep learning model. Providing or deploying a machine learning or deep learning model refers to training, optimizing or updating an algorithm for tasks such as clustering, regression or classification. Table 2 demonstrates how the query of FIG. 6 is built using workflow editor client application software. The editor allows users to leverage the distributed nature of the servers 204 and the remote system infrastructure to perform data transformation or aggregation prior to merging with a local workflow. The query in FIG. 6 shows a single remote data source, but the process can be performed with multiple remote data sources running in parallel. It will be appreciated that the DataMover element 608 can also move intermediate data from a remote server 204*a* to the local server 204*a*. Workflow segment execution terminates at the DataMover element 608 and the local server 204*b* is notified that data is available for workflow execution. For enhanced security, intermediate data can be deleted when the workflow completes or if it terminates on an error. The term "remote segment" extends to a workflow flow cell segment that starts with a remote data source and ends with a DataMover element 608, in accordance with examples of the present specification.

TABLE 2

Building the query of FIG. 6

1. Create a workflow, enter name and description, press "Create"
    2. Workflow editor displays a blank canvas
    3. Drag "Remote" element 604 from palette to canvas
    4. Click on the "Remote" element 604 and press the "Select Data Source" button to display the Datasource List dialog.l
    5. Select the Remote Server
    6. Select data source on Remote Server, the press "Apply" button
    7. Preview data is displayed in Preview pane.
    8. Drag "Select" element 606 from palette to canvas
    9. Link "Remote" element 604 to "Select" element 606
    10. Click on "Select" element 606 and press "Select Fields" button to display the "Select Fields" dialog
    11. Filter the columns and rows to see, then press the "Apply" button.
    12. Drag a "Data Mover" element 608 from palette to canvas, link Select element 606 to Data Mover element 608, then press "Apply" button.
    13. Drag an "Local" element 602 from palette to canvas, then press "Import File" button.
    14. Select file type (.csv) press the Upload File button to select a file to upload, then press "Apply" button.
    15. Drag a "Join" element 610 onto the canvas, link "Data Mover" element 608 to "Join" element 610 and also link "Local" element 602 to "Join" element 610.
    16. Click the "Join" element 610, press the "Select Columns" button to display the Join dialog. Choose the columns projection, then press "Next"
    17. Choose the columns projection, then press "Next"
    18. Choose the type of Join and select the related fields to use for Join. Press "Apply"
19. Drag a "Result" element 612 onto the canvas, link the "Join" element 610 and the "Result" element 612 and press the "Apply" button. Then press the "Save" button to save the workflow.

Figure 7:
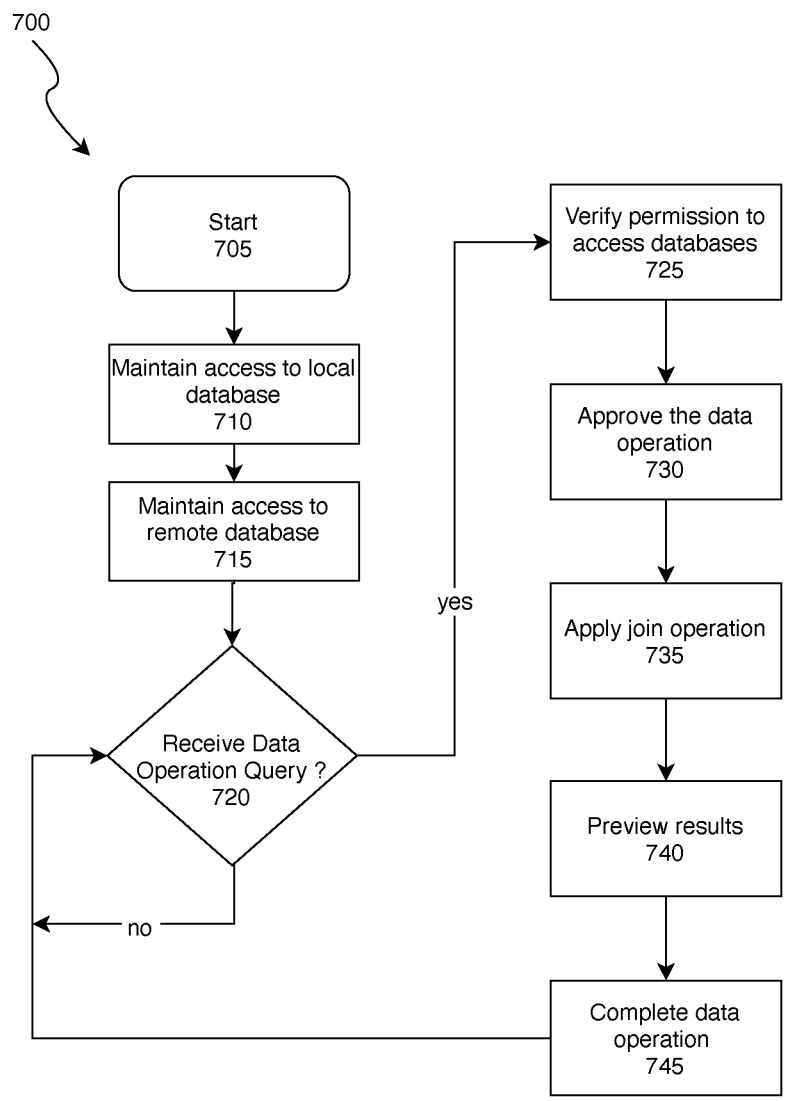
FIG. 7 is a flowchart of a federated data operation, according to an example of the present specification.

With reference to FIG. 7, a method 700 starts at 705 and, at 710, a local server 204 maintains access to a local data repository 206 and, at 715, a remote data repository 206 (e.g., via a remote server 204). At 720, the server 204 receives a federated data operation query. At 725, the server 204 verifies permission to access the local and remote data repositories. At 730, the data operation query is approved and, at 735, the results are merged using a join operation. At 740, a preview of the results can be provided to a user electronic device associated with the local server 204. At 745, the data operation is completed, and the method returns to monitor for data operation queries at 720.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including the steps of: maintaining access to a plurality of federated data sources comprising at least one local database and at least one remote database wherein the local database is subject to a first data policy controlled by the first server and the remote database is subject to a second data policy controlled by a remote server, receiving a federated data operation query from a user electronic device, verifying at least one permission attribute of the user electronic device relative to the first data policy and relative to the second data policy, responsive to the verifying, approving the federated data operation query based on the at least one permission attribute of the user electronic device, after the federated data operation query has been approved, running the federated data operation query to generate results of the federated data operation query comprising data fields from the at least one local database and the at least one remote database in compliance with the first data policy and the second data policy.

Implementations may include one or more of the following features: the data operation query includes an action for removing data fields, an action for modifying data fields, an action for exporting data fields to an external application, an action for querying data fields, an action for generating derived data fields, or an action for training a machine learning model. The local database can be a data repository that manages and stores one of structured and un-structured data. In one implementation, data operation query includes at least one of a SQL query operation based on domain specific language (DSL), a scripting operation, and a machine learning operation. The generating includes a join operation, a select operation, or a scripting operation. The join operation can be an inner join operation and the method further includes the step of aggregating one or more segments of the remote database by the remote server. The results of the federated data operation query can include a machine learning training model. The remote database can be a data segment of the remote database. The method can include caching the data segment in an auxiliary data structure in the local database and providing a preview of the federated data operation query to the user electronic device using the auxiliary data structure.

One general aspect includes at least one non-transitory computer-readable storage medium storing instructions that, when executed by at least one processor, cause the at least one processor to maintain access to a plurality of federated data sources comprising at least one local database and at least one remote database wherein the local database is subject to a first data policy controlled by the first server and the remote database is subject to a second data policy controlled by a remote server, receive a federated data operation query from a user electronic device, verify at least one permission attribute of the user electronic device relative to the first data policy and relative to the second data policy, responsive to the verifying, approve the federated data operation query based on the at least one permission attribute of the user electronic device, and after the federated data operation query has been approved, run the federated data operation query to generate results of the federated data operation query comprising data fields from the at least one local database and the at least one remote database in compliance with the first data policy and the second data policy.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method comprising the steps of:
    at a first server comprising a processor, a memory, and a network interface device connected to a network,
    maintaining access to a plurality of federated data sources comprising at least one local database and at least one remote database wherein the at least one local database is subject to a first data policy controlled by the first server and the at least one remote database is subject to a second data policy controlled by a remote server;
    receiving a federated data operation query from a user electronic device;
    verifying at least one permission attribute of the user electronic device relative to the first data policy and relative to the second data policy;
    responsive to the verifying, approving the federated data operation query based on the at least one permission attribute of the user electronic device; and
    after the federated data operation query has been approved, running the federated data operation query to generate results of the federated data operation query comprising data fields from the at least one local database and the at least one remote database in compliance with the first data policy and the second data policy.

2. The method of claim 1 further comprising transforming data fields from the at least one local database in compliance with the first data policy and transforming data fields from the at least one remote database in compliance with the second data policy.

3. The method of claim 1 wherein the federated data operation query comprises one of an action for removing data fields, an action for modifying data fields, an action for exporting data fields to an external application, an action for querying data fields, an action for generating derived data fields, and an action for training a machine learning model.

4. The method of claim 1 wherein the at least one local database comprises a data repository that manages and stores one of structured and un-structured data.

5. The method of claim 1 wherein the federated data operation query comprises at least one of a query operation based on domain specific language (DSL), a scripting operation, and a machine learning operation.

6. The method of claim 1 wherein the generating comprises one of a join operation, a select operation, and a scripting operation.

7. The method of claim 6 wherein the generating comprises an inner join operation and the method further includes the step of aggregating one or more segments of the at least one remote database by the remote server.

8. The method of claim 1 wherein the results of the federated data operation query comprise a machine learning training model.

9. The method of claim 1 wherein the at least one remote database comprises a data segment.

10. The method of claim 8 further comprising: caching a data segment in an auxiliary data structure in the at least one local database; and providing a preview of the federated data operation query to the user electronic device using the auxiliary data structure.

11. At least one non-transitory computer-readable storage medium storing instructions that, when executed by at least one processor, cause the at least one processor to:
    maintain access to a plurality of federated data sources comprising at least one local database and at least one remote database wherein the at least one local database is subject to a first data policy controlled by a first server and the at least one remote database is subject to a second data policy controlled by a remote server;
    receive a federated data operation query from a user electronic device;
    verify at least one permission attribute of the user electronic device relative to the first data policy and relative to the second data policy;
    responsive to the verifying, approve the federated data operation query based on the at least one permission attribute of the user electronic device; and
    after the federated data operation query has been approved, run the federated data operation query to generate results of the federated data operation query comprising data fields from the at least one local database and the at least one remote database in compliance with the first data policy and the second data policy, wherein the generating comprises a join operation.

* * * * *